United States Patent [19]
Voida

[11] 3,805,218
[45] Apr. 16, 1974

[54] BATTERY CABLE ASSEMBLY
[75] Inventor: George Voida, Albuquerque, N. Mex.
[73] Assignee: The United States of America as represented by the United States Atomic Energy Commission, Washington, D.C.
[22] Filed: Apr. 4, 1973
[21] Appl. No.: 347,758

[52] U.S. Cl.............. 339/148, 174/107, 174/115, 339/14 R, 339/275 T
[51] Int. Cl............................................ H01r 11/06
[58] Field of Search .... 339/148, 275 T, 14 R, 14 L; 174/107, 115

[56] References Cited
UNITED STATES PATENTS
1,634,280  7/1927  Zastrow........................ 339/275 T
1,782,447  11/1930  Scantom......................... 338/148
2,464,124  3/1949  Duvall............................ 174/107

Primary Examiner—E. A. Goldberg
Attorney, Agent, or Firm—John A. Horan; Ignacio Resendez

[57] ABSTRACT

A battery cable for use in severe electrochemical environments comprising a plurality of copper conductors clad with nickel and coated with insulation material, a nickel braid encompassing the insulated conductors, an encapsulant generally permeating and surrounding the nickel braid and the insulated conductors, nickel lugs welded to the conductors at one of the ends of the cable, and a molded connector portion at the other end of the cable. The nickel braid is twisted at its end and is welded to a lug to form a ground connector.

4 Claims, 3 Drawing Figures

PATENTED APR 16 1974 3,805,218

BATTERY CABLE ASSEMBLY

BACKGROUND OF INVENTION

The invention relates to a cable suitable for use in severe electrochemical environments.

The cable of this invention finds specific application as a battery cable where it encounters simultaneous alkaline electrolyte creepage and seepage and high charge and discharge currents. Prior art battery cables are designed generally to operate under extreme thermal, humid, or mechanical environments or a composite of these exposures. For such environments, the materials of construction and the finished assembly are generally satisfactory. However, the environment of an alkaline battery using lithium hydroxide (LiOH), sodium hydroxide (NaOH) or potassium hydroxide (KOH) electrolyte is extremely damaging to these prior cables. Of the above, KOH electrolyte may be preferred in alkaline batteries, such as nickel-cadmium batteries, because of its achievable purity which minimizes or prevents local degradation effects of various parts, including the anode, even in storage.

Attempts to use prior art cables in batteries using KOH electrolyte have not been entirely successful since galvanic activity proves highly degradative. The conductor wires, shield braid, and soldered connections become completely corroded under normal testing and operating conditions in relatively short periods of time. The negative conductor becomes completely disintegrated for five or six inches from the soldered joint. The electrolyte seeps under the insulation of the stranded conductor over this distance and seriously affects the copper. These degradative results are a consequence of the phenomenal creep characteristic of the KOH and other alkaline electrolytes. The electrolyte easily undermines the best adhesive bonds even under moderate test and storage conditions. Prior efforts to electroplate the copper wire with protective coatings also did not eliminate the problem since plating has inherent imperfections, such as pinholes, which permit degradation of the copper core.

SUMMARY OF INVENTION

In view of the above described limitations of the prior art, it is an object of this invention to provide a cable assembly suitable for use in alkaline electrolyte batteries, and specifically where the electrolyte is KOH.

It is an object of this invention to provide a cable assembly which is not seriously affected by severe electrochemical environments.

It is an object of this invention to provide a cable assembly which overcomes prior art limitations when used with a battery which uses KOH electrolyte.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of this invention.

The invention comprises a cable assembly for use in severe electrochemical environments comprising one or more conductors each of which has a plurality of copper strands which have been nickel clad and on which has been applied an insulating coating, the conductors being welded at the ends and also welded to connecting nickel lugs, a nickel braid shield disposed encompassing the length of and surrounding the conductors, a polyether-type polyurethane resin encapsulant or a flexibilized epoxy resin encapsulant enveloping and surrounding the conductors and nickel braid, and a connector portion at one end of the cable assembly.

DETAILED DESCRIPTION

Figure 1:
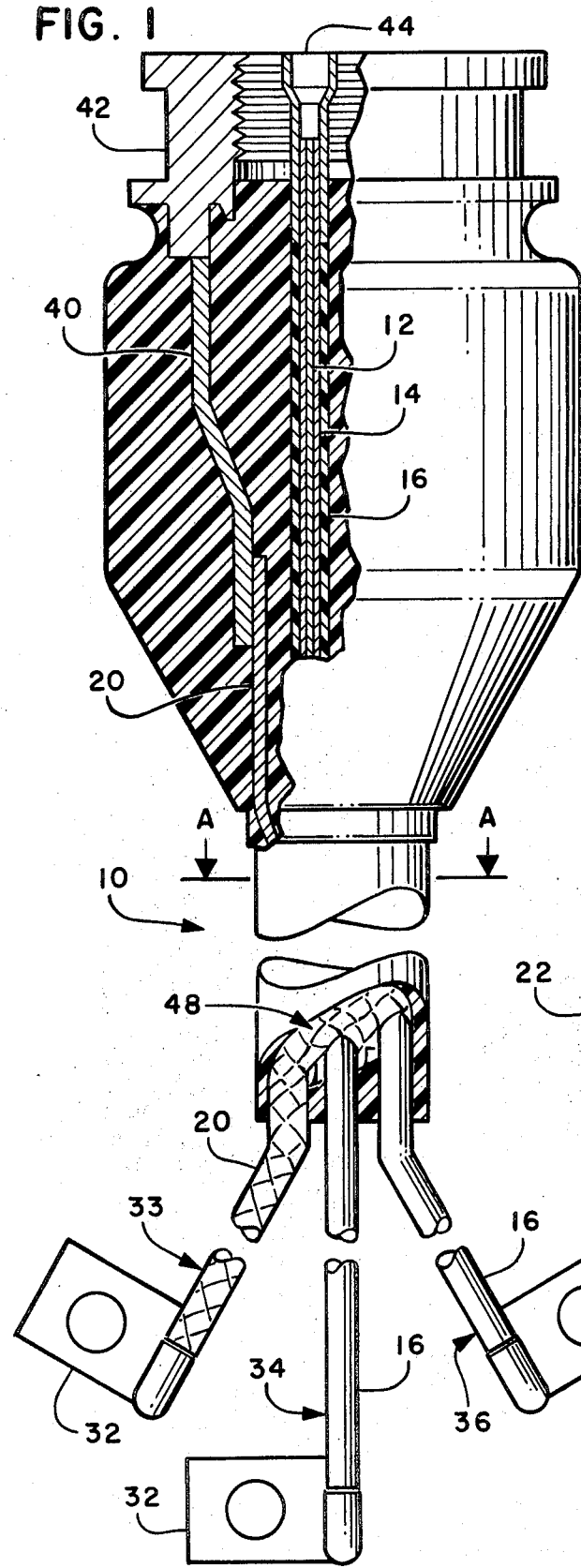
FIG. 1 is a partial cross section of the battery cable assembly of this invention.

As shown in the drawing, a cable assembly 10 suitable for use in severe electrochemical environments, such as in an alkaline electrolyte and particularly a KOH electrolyte battery, comprises a plurality of copper strands or wires 12 which may vary in diameter from about 0.005 inch to about 0.009 inch. The copper strands are clad with nickel 14 to a nickel thickness of from about 0.0003 inch to about 0.0007 inch. Cladding as used herein refers to the process of drawing a tube (in this case substantially 100 percent nickel) over copper wire. Cladding provides a continuous and unbroken covering for the copper wire without even minute pores or imperfections. The wire and its clad coating are then simultaneously extruded so as to become essentially integral and intimately interbonded by mechanical working.

The nickel clad copper strands or wires 12 may then have a coating of insulation 16 applied thereto. This insulation 16, hereinafter called the primary insulation, which may be extruded over each stranded clad conductor or otherwise applied thereto to provide a continuous covering over the strands, may be polytetrafluoroethylene (PTFE), a copolymer of fluorinated ethylene and propylene (FEP), polychlorotrifluoroethylene (PCTFE), polyvinylidene fluoride (PVF$_2$), polyvinylchloride (PVC), polyethylene, irradiated polyethylene, or other suitable plastic or elastomer with adequate chemical and environmental stability.

A nickel braid shield 20 is disposed over and encompassing a substantial portion of the length and surrounding the insulated and nickel clad copper strands 12. The braid is preferably made of from about 0.004 inch to about 0.006 inch diameter substantially 100% nickel wire. The density of the woven braid should be such so as to provide at least about 90 percent coverage of braid over the insulated conductors where the braid encompasses the insulated conductors. The nickel braid density as used herein refers to the amount of nickel braid that is in the shield to provide at least 90 percent coverage. Therefore, the gaps or openings between wires in the shield should comprise equal to or less than 10 percent. Pure nickel wire provides electrochemical stability and insures rapid and reliable joining by welding. The wire is sufficiently small to permit the construction of a finished cable assembly with optimum flexibility. The cross-sectional area of the braided nickel shield should provide an electrical resistance not appreciably higher than that of copper or plated copper.

The ends of a group of nickel clad copper strands, such as between 20 and 30 strands, may then be joined, preferably by welding, to insure a good impregnable bond and to thereby seal the copper core of the nickel clad conductor against adverse conditions. The joined nickel clad copper strands may in turn be joined to a suitable, preferably about 100 percent nickel lug 32 or other connecting device by a suitable welding procedure, such as pulse-arc welding, to provide a diffusion zone of high nickel concentration and thereby eliminate bi-metallic joints as well as provide maximum electrochemical stability and high resistance to electrochemical environments.

It should be understood that "conductor" may refer to a multiplicity of nickel coated copper strands. Thus as shown in FIG. 3, which is a modification of the FIG. 1 embodiment, a group of four copper strands would form the anode conductor, a group of four other copper strands would form the cathode and the nickel braid would serve as ground. There may be a plurality of these conductors within one metal braid shield. The embodiment of FIGS. 1 and 2 however, for clarity and simplicity of illustration, incorporates a single strand as the conductor.

In order to provide maximum bonding to potting encapsulant 22 which is added to a cable assembly and which envelopes primary insulation 16 as well as a nickel braid 20, the surface of the primary insulation 16 may be chemically pretreated, heat treated, reconstituted, dip coated, or otherwise protected by a combination of these preparations to provide suitable adhesion on potting or encapsulation. For example, if the primary insulation 16 is polytetrafluoroethylene, which is a vinyl polymer, the insulation on the conductor wire may be coated with such as polyimide in order to provide optimum adhesion and environmental sealing with the encapsulating resin. Other suitable pretreatments which may be used for the same purpose are such as ozone treatment of polyethylene, processing of insulation through a dielectric field, etc.

A polyether-type polyurethane resin encapsulant 22 or a flexibilized epoxy resin encapsulant 22 may be used to envelope the conductors and the braid 20. The high fluidity of the residue during the encapsulating process enables the resin to permeate through the nickel braid 20 and completely surround each insulated nickel clad copper strand 12.

FIG. 1 is a typical battery cable in partial cross section made by this invention. As shown, each conductor 34 and 36 comprises a single strand 12 which are all encircled or surrounded by a metal braid 20 and the resin encapsulant 22. These conductors pass through openings in the braid and are welded to lugs 32. The braid, which serves as electrical ground 33, is also welded to a lug 32. These lugs may be attached to a suitable electrical connection such as by screwing a screw through opening or port 37 in lug 32, to an anode and cathode of a battery. The conductors 34, 36, cable assembly 10 and ground 33 may be of any suitable length to accomplish the intended purpose. As shown, the metal braid may be dimensionally reduced in size such as by folding, twisting, or the like at one end prior to encapsulation with potting encapsulant 22, and the conductors 34, 36 passed through openings in the braid 20. Encapsulation facilitates termination of the electromagnetic radiation (EMR) shielding of the conductors. The folded or the like area 48 in embodiment 10 is beyond a point in which EMR shielding is required. Continuation of braid 20 on the conductors 34, 36 may reduce desired flexibility and possibly impede engagement of lugs 32 with appropriate posts. Encapsulation terminates at a location adjacent and beyond the conductor projection through the nickel braid shield wall. Thus the ground 33 which comprises braid 20 may be suitably attached to a grounding post or the like (not shown).

Figure 2:
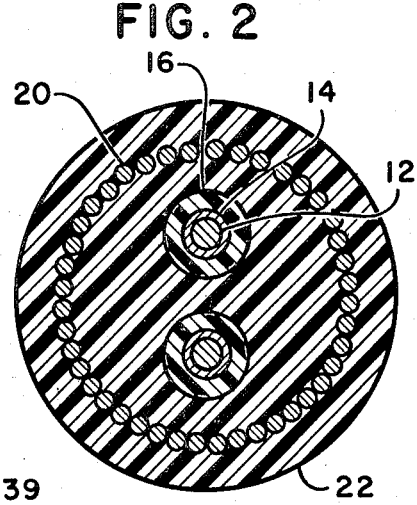
FIG. 2 is a cross section view along line A—A of FIG. 1.
Figure 3:
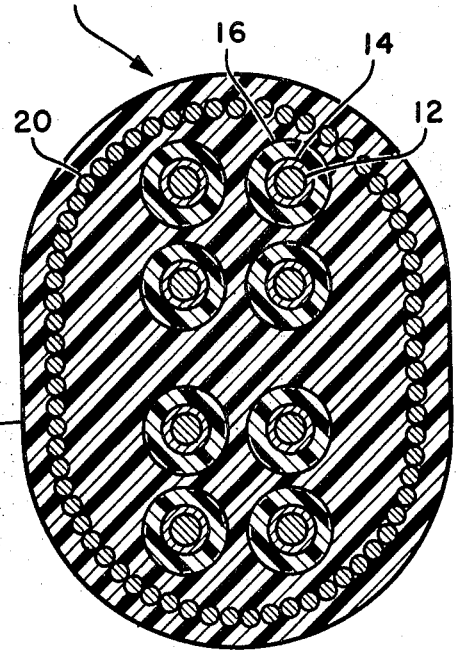
FIG. 3 is a cross section representation of an alternate embodiment of this invention.

FIG. 2 is a cross section of cable assembly 10 along lines A—A of FIG. 1. For sake of illustration, the conductors 34, 36 each comprise a single copper strand 12 clad with nickel 14 and coated with a primary insulating material 16. A nickel braid 20 is then disposed over and generally surrounding the conductors 34, 36 and the whole (i.e., conductors and shield) is then encapsulated using a suitable potting encapsulant.

The all nickel construction of braid shield, lugs, clad copper strands, etc., offers two exceptional properties:

1. Stability to the KOH electrolyte; and
2. Weldability to provide readily made and reliable joints not affected by the electrochemical environment.

As illustrated in FIG. 1, the encapsulating resin 22 at the cable end opposite the welded lugs may be molded into a suitable coupler or connector 39. The conductors, which may comprise one insulated, nickel clad copper strand 12 as shown in FIG. 2, or a plurality of copper strands as described hereinabove, may be connected to electrical solder pots 44 through appropriate means such as welding, soldering, or brazing to form a terminated connector. A threaded adapter ring 42 may engage with a mating connector, not shown. The nickel braid 20 which is appropriately twisted to form a ground conductor 33 attached to lug 32 is connected at its other end to a generally annular shield 40, which is preferably made of brass, by welding, soldering, brazing, etc. The shield is connected to adapter 42 in like manner. The shield 40 provides stiffness and rigidity to coupler 39. The connected shield 40, adapter 42, terminated connector pins, etc., are all molded in place using encapsulating resin 22 and suitable molds.

The thickness of the nickel cladding minimizes damage during handling and cable fabrication. Cables made in accordance with these specifications were subjected to KOH electrolyte spray test in order to determine the stability of the design to very intense electrolyte exposure. The electrolyte spray consisted of a 40% KOH solution used in a battery. The spray was applied daily over the encapsulated portion and lug terminations. At the same time, the cable was subjected to alternating forward and reverse currents of 5 amperes. Such tests show that the cables can be subjected to intense electrolyte environments without incurring objectionable degradation or breakdown, and confirm the adequacy of the improved development cable to resist the most severe electrolyte exposures encountered.

Whereas prior art cable assemblies underwent rapid electrochemical deterioration on exposure to corrosive environment, the new described cable assembly is electrically and physically unaffected by (a) evacuation in potassium hydroxide electrolyte, (b) extended immersion to potassium hydroxide electrolyte, (c) exposure to thermal shock, (d) exposure to high humidity, (e)

simultaneous exposure to potassium hydroxide electrolytes spray and simulated charging and discharging of an alkaline battery, and (f) varying combinations of these hazards. Simulated tests of the cable assembly correspond to about five years of actual field use. The cable assemblies may be used in marine, automobile, aircraft, electrochemical, spacecraft, outer space vehicles and installations, and emergency standby power applications without the occurrence of objectionable electrical and physical breakdown due to electrochemical corrosive effects upon the battery cables.

What is claimed is:

1. A cable for use in electrochemical environments comprising an electrical conductor including a plurality of copper strands of from about 0.005 inch to about 0.009 inch diameter and having a from about 0.0003 to about 0.0007 inch nickel cladding enclosing and integral with each strand, a layer of insulation enclosing each said nickel clad copper strand, said insulation selected from the group consisting of polytetrafluoroethylene, a copolymer of fluorinated ethylene and propylene, polychlorotrifluoroethylene, polyvinylidene fluoride, polyvinylchloride, polyethylene, and irradiated polyethylene; a nickel braid shield of from about 0.004 inch to about 0.006 inch diameter and about 100 percent nickel wire generally encompassing said conductors; and encapsulating material selected from the group consisting of polyether-type polyurethane resin and flexibilized epoxy resin encapsulating said one or more insulated conductors and said nickel braid.

2. The cable of claim 1 wherein said nickel braid density is at least 90 percent.

3. The cable of claim 1 wherein nickel lugs are welded at an end of said insulated conductors at one end of said cable, solder pots are connected to another end of said conductor at another end of said cable, said braid wire is welded to one of said nickel lugs at said one end of said cable to serve as electrical ground, a generally annular brass shield is connected at said other end of said cable to said nickel braid shield, an adapter is connected to said generally annular brass shield, and said encapsulating material partially encapsulates said adapter, said brass shield, and said solder pots.

4. The cable of claim 3 wherein said conductors project through a wall of said nickel braid shield at said one end of said cable and said encapsulating material encapsulates said conductor projection and terminates at a location adjacent and beyond said conductor projection through said nickel braid shield wall.

* * * * *